(12) United States Patent
De Angelis

(10) Patent No.: US 6,392,551 B2
(45) Date of Patent: *May 21, 2002

(54) SYNTHETIC FIBER CABLE WITH TEMPERATURE SENSOR

(75) Inventor: Claudio De Angelis, Lucerne (CH)

(73) Assignee: Inventio AG, Hergiswil (CH)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/487,985

(22) Filed: Jan. 20, 2000

(30) Foreign Application Priority Data

Jan. 22, 1999 (EP) .............................. 99810052

(51) Int. Cl.⁷ ............................... G08B 17/00
(52) U.S. Cl. ...................... 340/584; 340/668; 361/103; 361/106
(58) Field of Search ................. 340/584, 596, 340/598, 583, 600, 601, 665, 668; 385/100, 101, 113; 338/22 R, 223 D; 219/494; 361/103, 106; 187/413, 264, 266

(56) References Cited

U.S. PATENT DOCUMENTS

| | | | | |
|---|---|---|---|---|
| 4,072,213 A | * | 2/1978 | Salmon | 187/266 |
| 4,372,693 A | * | 2/1983 | Lutz | 340/594 |
| 5,086,880 A | * | 2/1992 | Pearce | 187/413 |
| 5,119,457 A | * | 6/1992 | Callahan | 385/107 |
| 5,178,465 A | * | 1/1993 | Amano et al. | 374/131 |
| 5,313,185 A | * | 5/1994 | DeChurch | 338/22 R |
| 5,468,913 A | * | 11/1995 | Seaman et al. | 174/102 R |
| 5,834,942 A | * | 11/1998 | De Angelis | 324/522 |
| 5,841,617 A | * | 11/1998 | Watkins, Jr. | 361/106 |
| 5,862,030 A | * | 1/1999 | Watkins, Jr. | 361/103 |
| 6,072,928 A | * | 6/2000 | Ruffa | 385/100 |

\* cited by examiner

Primary Examiner—Van Trieu
(74) Attorney, Agent, or Firm—MacMillan, Sobanski & Todd, LLC

(57) ABSTRACT

A synthetic fiber cable, preferably of polyamide material, consists of a bundle of load-bearing synthetic material fibers and at least one conductive temperature sensor element extending a length of the cable. The temperature sensor element forms, in dependence on the temperature, a conductive connection over the length of the cable, which connection is constantly monitored by a measurement circuit. The connection is interrupted at a checking circuit in the case of temperatures critical for the synthetic fiber cable. The temperature sensor element can be a fine wire melting at the critical temperature. The synthetic fiber cable can be used in elevator installations amongst other things as a safety device, especially as a fire alarm.

14 Claims, 2 Drawing Sheets

SYNTHETIC FIBER CABLE WITH TEMPERATURE SENSOR

BACKGROUND OF THE INVENTION

The present invention relates generally to a synthetic fiber cable, particularly as a support element for elevators, consisting of a bundle of reinforced load-bearing synthetic material fibers.

Reinforced synthetic fiber cables replace conventional wire cables to an increasing extent in applications such as, for example, with elevator installations where on the one hand large cable lengths are necessary and on the other hand for energy reasons the requirement exists for smallest possible moved masses.

Such synthetic fiber cables are a textile product of linear reinforced chemical fiber materials, preferably aramide or polyamide, which are spun into cable yarns and are produced by cable forming without rotation, by two-stage or multiple-stage twisting and/or sheathing. However, the cable breakage strength for chemical fibers significantly diminishes by comparison with steel cables even at substantially lower temperatures, before they finally melt. The melting point of aramides lies in the region of 450 to 500° Celsius. At temperatures of above 180° Celsius the load-bearing capability of synthetic fiber cables already begins to reduce.

In order to be able to use synthetic fiber cables of that kind, in particular as a running cable in conveying technology such as elevator construction, it is necessary to recognize the cable state free of doubt. For this purpose a device for recognition of readiness of synthetic fiber cables for discard is known from the European patent document 0 731 209 A1. The principle of function of this device is that indicator fibers are integrated in some of the strands of reinforced fibers with specific mechanical properties. The material properties of these indicator fibers depend on those of the load-bearing synthetic fibers, wherein the breaking elongation and the modulus of elasticity are so selected so that the indicator fibers break, due to material fatigue and abrasive wear, etc., earlier than the load-bearing fibers. These indicator fibers conduct current and are constantly monitored in terms of measurement technology. If the constant monitoring recognizes a predetermined number of failed indicator fibers, the cable has to be replaced by a new one.

With the device described so far with respect to construction and function, the breakdown of the cable caused by mechanical loading can be reliably recognized, but special fire protection requirements imposed on synthetic fiber cables cannot be satisfactorily fulfilled by that.

SUMMARY OF THE INVENTION

The present invention concerns a synthetic fiber cable provided with a temperature sensor to monitor the operational safety in the case of thermal overheating and/or in the case of fire. The synthetic fiber cable fulfils in particular the fire protection requirements in elevator construction where the safety of passengers must at no time be put at risk.

With the synthetic fiber cable according to the present invention a monitoring of the temperature in the cable and thus indirectly also over the entire shaft length and engine room is possible for the first time. The conductive connection by the cable is formed only at temperatures below the temperature critical for the cable. In the case of temperatures lying above that the conductive connection is interrupted and accordingly no electrical or optical signal or the like can be transmitted, which can be simply established in terms of measurement technology. In co-operation with a checking device, cable damage caused by heat can be detected promptly in this manner, reproduced at, for example, an elevator control, and appropriate measures for evacuation of passengers can be carried out by this without delay in time.

In a development of the invention, a temperature sensor element with temperature dependent conductivity for the applied checking signal is provided. This offers the advantage that starting out from a constructionally determined value, the strength of the checking signal can also be correspondingly changed. The respective cable temperature can be ascertained on the basis of this quantitative signal. The temperature-dependence can in that case be selected so that, on exceeding of the critical temperature, conductivity is no longer present.

A preferred development of the invention proposes that the temperature sensor element has a temperature-critical material strength that is lower than that of the load-carrying synthetic material fibers. On attainment of a constructionally predetermined temperature, the temperature sensor element fails in that, for example, it melts or breaks and thus interrupts the conductive connection. A qualitative checking signal, for the evaluation of which a very simple measurement technology is sufficient, is thereby obtained.

In preferred embodiments the temperature sensor element can also be constructed as electrical conductors, optical conductors or the like, by which a checking signal can be transmitted. Essential in the selection of the conductor material used in that case is a fatigue bending strength that at least corresponds with that of the load-bearing fibers, so that a work-induced material failure is excluded. For example, the temperature sensor element can be worked in with the cable as an electrical conductor in the form of a metal wire or a synthetic yarn or a material combination consisting thereof.

The temperature sensor element is preferably wound around the cable and covered by cable sheathing preferably formed in a pressure injection-molding press. In an advantageous embodiment in that case, several temperature sensor elements are arranged parallel to the strands and/or embedded, in the cable longitudinal direction, in the cable sheathing around the cable. This offers the advantage that the temperature sensor element can be laid closely against the cable structure and the mechanical loading of the temperature sensor element when running over rollers is small.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
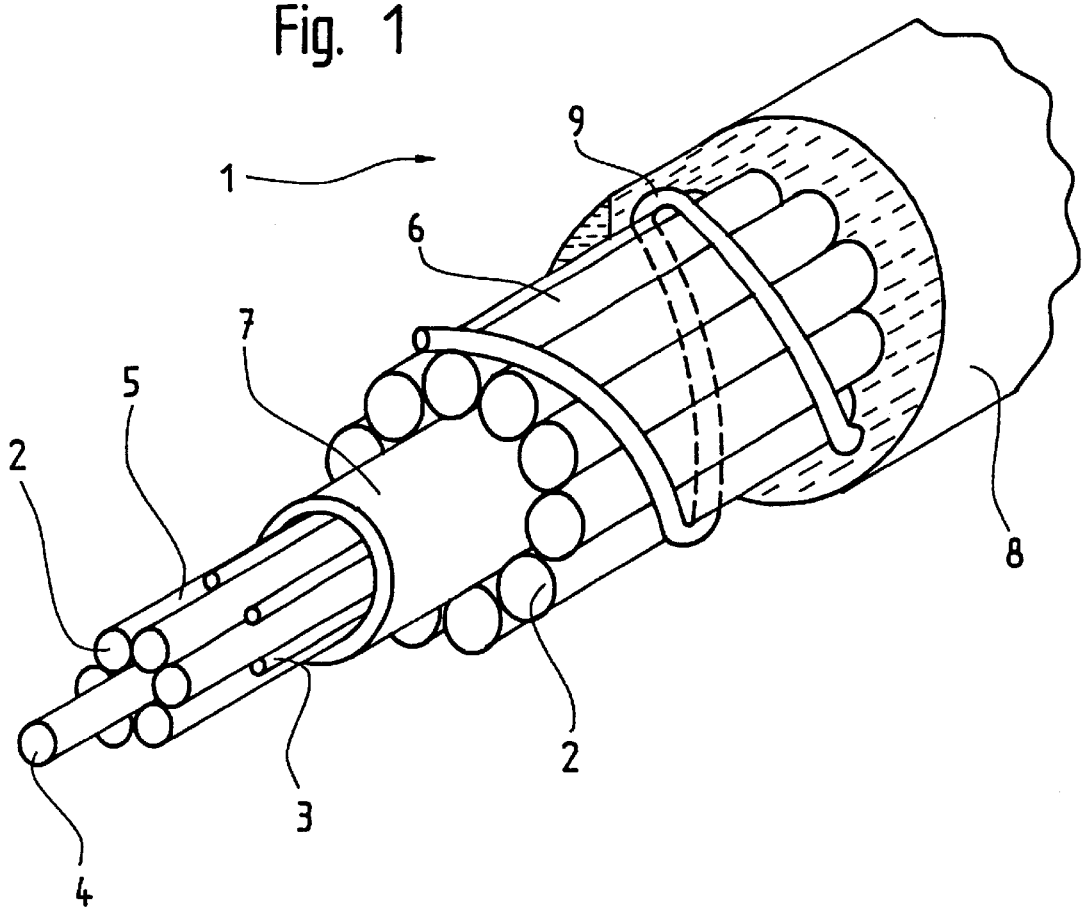
FIG. 1 is a perspective view of a multi-layer aramide fiber cable with a temperature sensor element helically wound around the cable and laid in the cable sheathing.

The perspective illustration of the FIG. 1 shows the build-up of a sheathed aramide fiber cable 1 of aramide fiber strands 2 which, together with filler strands 3, are arranged in the manner of layers around a core 4. A wear-reducing intermediate sheathing 7, which is preferably profiled, is formed between an inner strand layer 5 of the strands 2 and an outermost strand layer 6. The outermost strand layer 6 is covered by a cable sheathing 8, preferably formed of polyurethane or polyamide material. A thinner wire 9, thinner than the strands 2 and 3, is helically wound around the outermost strand layer 6 over the entire cable length. The cable sheathing 8 is extrusion molded on over the wire 9, so that the wire 9 is embedded in the cable sheathing material and covered by this.

The wire 9 consists of a metal alloy and is electrically conductive. It has an electrical resistance that rises with increasing temperature. The resistance is constantly detected by a checking control device described further below. The composition of the alloy is selected in such a manner that the wire melts at a temperature range of 100 to 120° Celsius.

Instead of winding the wire 9 around the cable 1, the can be laid in the cable sheathing 8 parallel to the aramide fiber strands 2 of the outermost strand layer 6 or, however, be worked up together with the load-bearing aramide fiber strands 2 to form the aramide fiber cable.

Figure 2:
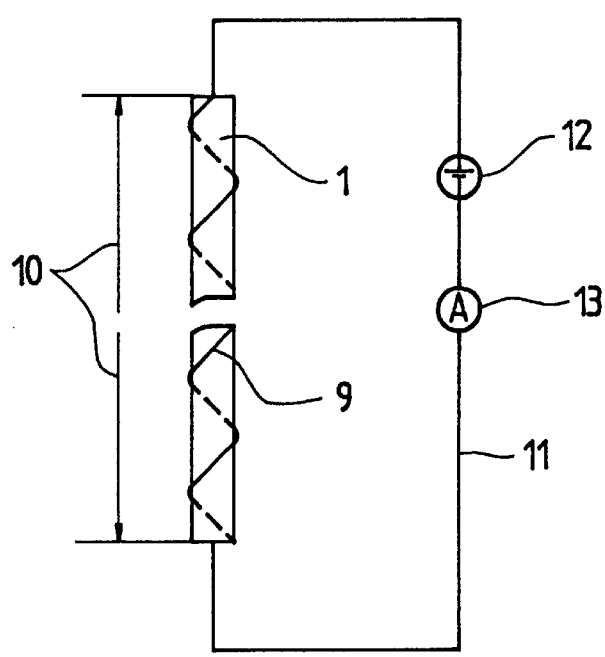
FIG. 2 is a schematic view of a monitoring circuit for the aramide fiber cable illustrated in the FIG. 1.

The monitoring, by measurement technology, of the aramide fiber cable 1 illustrated in the FIG. 1 is shown in the FIG. 2. For checking whether the electrically conductive connection produced by means of the temperature sensor element or elements, here the copper wire 9, is intact over the cable length 10 or a specific cable length portion, an electrical voltage can, for example, be applied in a checking circuit 11 to the two ends of the wire 9. A battery 12 or a voltage generator, for example, is suitable as a voltage source for that purpose. It can then be recognized with the assistance of an ammeter 13 or telltale lamp whether or not a current flows through the copper wire 9.

In the case of embodiments with a plurality of the wires 9 that are each individually monitored, a failure of the temperature sensor element on grounds other than a too high cable temperature can be recognized by comparison of the measurement results of the individual temperature sensor elements. An erroneous alarm can be excluded in this manner. Analogously, distinction is made between measurement results of temperature sensor elements of, for example, several cables associated with one elevator drive in order to exclude a loss summation.

Figure 3:
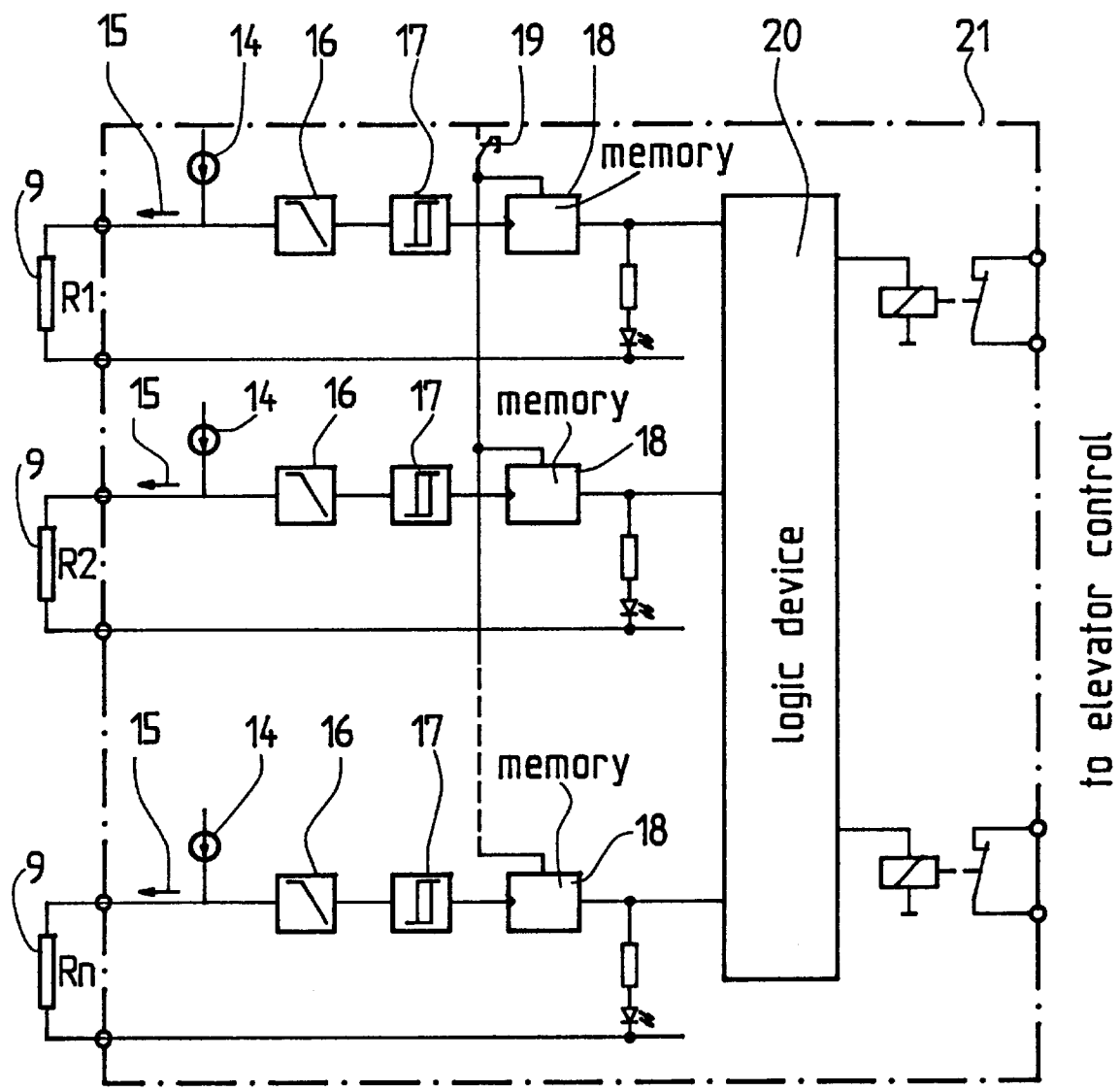
FIG. 3 is a circuit diagram of a checking circuit for use with the cable shown in the FIG. 1.

A circuit suitable for that purpose is known from, for example, the European patent document 0 731 209 A1. FIG. 3 shows such a checking circuit 21, that is connected to the monitoring circuit 11 in place of an ammeter. A constant current 15 is fed by way of a voltage source 14 to each wire 9, a resistance RI to RN being illustrated for each wire 9. A low-pass filter 16 is connected to the wire 9 and filters the arriving pulses and feeds these to a threshold value switch 17. The threshold value switch 17 compares the measured voltages. On exceeding of specific limit values, i.e. due to a thermal overheating of the temperature sensor element 9, the resistance is so large that the permissive voltage value is exceeded. This exceeding of the limit value is stored by a non-volatile store 18 memory. The store 18 can be cancelled by means of a reset button 19 or it passes on its data to a logic device 20 that is connected with the elevator control.

Each wire 9 is correspondingly linked to the network and constantly monitored. As soon as two or more of these temperature sensors are interrupted and thus a temperature induced damage of the synthetic fiber cable is to be expected, the elevator control automatically drives the elevator car to the evacuating position and stops the car. Moreover, it is possible to automatically inform a message center or the fire service about the abnormal state by way of the checking control device.

A further possibility of protection against high temperatures consists in positioning thermoelements in fixed location at the end connection of the synthetic fiber cables, for example at a coupling to the car, either on the upper yoke of the car or on the counterweight or, however, in the engine room of 2:1 suspended elevators, and, on triggering of a bimetallic contact or the like at detected temperatures of about 100° Celsius, issuing a report by way of the transmission apparatus to the control. The control then informs the emergency control center or, directly, the fire service.

During travel down a shaft, a smoke alarm mounted at the car can in a given case detect smoke at specific stories, localize it, control the elevator to go past and notify the emergency call center or fire service by way of the transmission apparatus. From the data, present at the control, with respect to the cage position in the shaft and the moment of triggering the alarm, the emergency call center and/or fire service can obtain corresponding data for minimization of damage.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A synthetic fiber rope for use as an elevator cable supporting a load comprising:
    a bundle of load-bearing synthetic material fibers including an outer layer of strands formed around a core, said core and said strands extending between opposite ends of the rope;
    a sheathing covering said outer layer of stands and having an outer surface forming an outer surface of the rope; and
    at least one temperature sensor means positioned between said outer layer of strands and said outer surface of said sheathing and forming a conductive connection between the ends of the rope, said temperature sensor means changing a characteristic of said conductive connection at a predetermined temperature lower than a temperature at which the rope is damaged by heat to permanently interrupt conduction and to signal an operational safety concern related to the load-bearing capability of the rope.

2. The rope according to claim 1 wherein said temperature sensor means has a temperature-dependent electrical conductivity and said characteristic is electrical resistance.

3. The rope according to claim 1 wherein said temperature sensor means has a temperature-critical material strength smaller than a material strength of said load-bearing synthetic material fibers.

4. The rope according to claim 1 wherein said temperature sensor means is one of an electrical conductor and an optical conductor.

5. The rope according to claim 1 wherein said temperature sensor means is one of a yam and a wire.

6. The rope according to claim 1 wherein said temperature sensor means is molded in said sheathing.

7. The rope according to claim 1 wherein said temperature sensor means forms said conductive connection at temperatures below 100° Celsius.

8. The rope according to claim 1 including a checking means connected to said temperature sensor means for continuous checking of conductivity.

9. The rope according to claim 1 wherein said temperature sensor means generates said operational safety concern signal as a fire alarm signal indicating a presence of a fire.

10. The rope according to claim 1 wherein a fatigue bending strength of said temperature sensor means at least corresponds with a fatigue bending strength of said strands.

11. An elevator car support for use in an elevator installation to suspend an elevator car comprising:
- a synthetic fiber load-bearing rope having a length and an end for attachment to an elevator car, said rope including an outer layer of strands covered by a molded sheathing; and
- a sensor means extending said length of said rope for sensing a temperature and changing a characteristic at a predetermined temperature lower than a temperature at which the said rope is damaged by heat, said sensor means being positioned adjacent said outer layer of strands and permanently changing from conductive to non-conductive at said predetermined temperature to signal an operational safety concern related to the load-bearing capability of said rope.

12. The support according to claim 11 wherein said predetermined temperature is in a range of approximately 100° through 120° Celsius.

13. The support according to claim 11 wherein said sensor means has a temperature-critical material strength smaller than a material strength of said strands and a fatigue bending strength of said sensor means at least corresponds with a fatigue bending strength of said strands.

14. A synthetic fiber rope for use as an elevator cable supporting a load comprising:
- a bundle of load-bearing synthetic material fibers including an outer layer of strands formed around a core, said core and said strands extending between opposite ends of the rope;
- a molded sheathing covering said outer layer of stands and having an outer surface forming an outer surface of the rope; and
- at least one temperature sensor means positioned on said outer layer of strands and embedded in said sheathing and forming a conductive connection between the ends of the rope, said temperature sensor means permanently interrupting conduction at a predetermined temperature lower than a temperature at which the rope is damaged by heat, said temperature sensor means having a temperature-critical material strength smaller than a material strength of said strands and a fatigue bending strength of said temperature sensor means at least corresponding with a fatigue bending strength of said strands.

* * * * *